US011164588B2

(12) United States Patent
Alonso et al.

(10) Patent No.: US 11,164,588 B2
(45) Date of Patent: *Nov. 2, 2021

(54) MAGNETIC DETECTION OF REPLAY ATTACK

(71) Applicant: Cirrus Logic International Semiconductor Ltd., Edinburgh (GB)

(72) Inventors: César Alonso, Madrid (ES); John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,014

(22) Filed: Jul. 27, 2020

(65) Prior Publication Data

US 2020/0357415 A1    Nov. 12, 2020

Related U.S. Application Data

(63) Continuation of application No. 16/020,406, filed on Jun. 27, 2018, now Pat. No. 10,770,076.

(Continued)

(51) Int. Cl.
*G10L 17/22* (2013.01)
*G10L 25/03* (2013.01)
(Continued)

(52) U.S. Cl.
CPC .............. *G10L 17/22* (2013.01); *G06F 21/32* (2013.01); *G06F 21/554* (2013.01); *G10L 17/10* (2013.01);
(Continued)

(58) Field of Classification Search
CPC .. G06F 21/32; G06F 21/554; G06F 2221/034; G06F 3/165; H04W 12/122;
(Continued)

(56) References Cited

U.S. PATENT DOCUMENTS

| | | |
|---|---|---|
| 5,197,113 A | 3/1993 | Mumolo |
| 5,568,559 A | 10/1996 | Makino |

(Continued)

FOREIGN PATENT DOCUMENTS

| | | |
|---|---|---|
| AU | 2015202397 B2 | 5/2015 |
| CN | 1937955 A | 3/2007 |

(Continued)

OTHER PUBLICATIONS

Chen et al, "You can hear but you cannot steal: defending against voice impersonation attacks on smartphones", Proceedigns of the International Conference on Distributed Computing Systems, p. 183-195PD: Jun. 5, 2017 (Year: 2017).*

(Continued)

*Primary Examiner* — Linda Wong
(74) *Attorney, Agent, or Firm* — Jackson Walker L.L.P.

(57) ABSTRACT

A method of detecting a replay attack on a voice biometrics system comprises: receiving an audio signal representing speech; detecting a magnetic field; determining if there is a correlation between the audio signal and the magnetic field; and if there is a correlation between the audio signal and the magnetic field, determining that the audio signal may result from a replay attack.

17 Claims, 11 Drawing Sheets

Related U.S. Application Data

(60) Provisional application No. 62/526,034, filed on Jun. 28, 2017.

(51) Int. Cl.

| | | |
|---|---|---|
| *H04L 9/32* | (2006.01) | |
| *H04L 29/06* | (2006.01) | |
| *G06F 21/32* | (2013.01) | |
| *H04K 1/00* | (2006.01) | |
| *H04W 12/122* | (2021.01) | |
| *G06F 21/55* | (2013.01) | |
| *H04R 1/40* | (2006.01) | |
| *G10L 21/0216* | (2013.01) | |
| *G10L 25/78* | (2013.01) | |
| *G07C 9/37* | (2020.01) | |
| *G10L 17/10* | (2013.01) | |
| *H04R 3/00* | (2006.01) | |

(52) U.S. Cl.
CPC ............... *G10L 25/03* (2013.01); *H04K 1/00* (2013.01); *H04L 9/3231* (2013.01); *H04L 63/0861* (2013.01); *H04L 63/1466* (2013.01); *H04R 1/406* (2013.01); *H04R 3/005* (2013.01); *H04W 12/122* (2021.01); *G06F 2221/034* (2013.01); *G07C 9/37* (2020.01); *G10L 25/78* (2013.01); *G10L 2021/02166* (2013.01); *H04R 2499/13* (2013.01)

(58) Field of Classification Search
CPC ........ H04W 12/06; G10L 17/10; G10L 25/03; G10L 25/78; G10L 2021/02166; G10L 15/20; G10L 15/22; G10L 19/00; H04K 1/00; H04L 63/0861; H04L 63/1466; H04R 1/406; H04R 3/005; H04R 2499/13; H04R 9/06; H04R 29/001; H04R 1/403; H04R 5/04; H04R 1/326; H04R 19/013; H04R 19/02; H04R 19/04; H04R 2209/024; H04R 29/004; H04R 29/005; H04R 3/08; G07C 9/37
See application file for complete search history.

(56) References Cited

U.S. PATENT DOCUMENTS

| | | | |
|---|---|---|---|
| 5,710,866 A | 1/1998 | Alleva et al. | |
| 5,787,187 A | 7/1998 | Bouchard et al. | |
| 6,182,037 B1 | 1/2001 | Maes | |
| 6,229,880 B1 | 5/2001 | Reformato et al. | |
| 6,480,825 B1 | 11/2002 | Sharma et al. | |
| 7,016,833 B2 | 3/2006 | Gable et al. | |
| 7,039,951 B1 | 5/2006 | Chaudhari et al. | |
| 7,418,392 B1 | 8/2008 | Mozer et al. | |
| 7,492,913 B2 | 2/2009 | Connor et al. | |
| 8,442,824 B2 | 5/2013 | Aley-Raz et al. | |
| 8,489,399 B2 | 7/2013 | Gross | |
| 8,577,046 B2 * | 11/2013 | Aoyagi | G01S 3/8036 381/26 |
| 8,856,541 B1 | 10/2014 | Chaudhury et al. | |
| 8,997,191 B1 | 3/2015 | Stark et al. | |
| 9,049,983 B1 | 6/2015 | Baldwin | |
| 9,171,548 B2 | 10/2015 | Valius et al. | |
| 9,305,155 B1 | 4/2016 | Vo et al. | |
| 9,317,736 B1 | 4/2016 | Siddiqui | |
| 9,390,726 B1 | 7/2016 | Smus et al. | |
| 9,430,629 B1 | 8/2016 | Ziraknejad et al. | |
| 9,484,036 B2 | 11/2016 | Kons et al. | |
| 9,548,979 B1 | 1/2017 | Johnson et al. | |
| 9,600,064 B2 | 3/2017 | Lee et al. | |
| 9,641,585 B2 | 5/2017 | Kvaal et al. | |
| 9,646,261 B2 | 5/2017 | Agrafioli et al. | |
| 9,659,562 B2 | 5/2017 | Lovitt | |
| 9,665,784 B2 | 5/2017 | Derakhshani et al. | |
| 9,984,314 B2 | 5/2018 | Philipose et al. | |
| 9,990,926 B1 | 6/2018 | Pearce | |
| 10,032,451 B1 | 7/2018 | Mamkina et al. | |
| 10,063,542 B1 | 8/2018 | Kao | |
| 10,079,024 B1 | 9/2018 | Bhimanaik et al. | |
| 10,097,914 B2 | 10/2018 | Petrank | |
| 10,192,553 B1 | 1/2019 | Chenier et al. | |
| 10,204,625 B2 | 2/2019 | Mishra et al. | |
| 10,210,685 B2 | 2/2019 | Borgmeyer | |
| 10,255,922 B1 | 4/2019 | Sharifi et al. | |
| 10,277,581 B2 | 4/2019 | Chandrasekharan et al. | |
| 10,305,895 B2 | 5/2019 | Barry et al. | |
| 10,334,350 B2 | 6/2019 | Petrank | |
| 10,460,095 B2 | 10/2019 | Boesen | |
| 10,467,509 B2 | 11/2019 | Albadawi et al. | |
| 10,692,492 B2 | 6/2020 | Rozen et al. | |
| 10,733,987 B1 | 8/2020 | Govender et al. | |
| 10,977,349 B2 | 4/2021 | Suh et al. | |
| 11,023,755 B2 * | 6/2021 | Lesso | G01S 7/52004 |
| 2002/0194003 A1 | 12/2002 | Mozer | |
| 2003/0033145 A1 | 2/2003 | Petrushin | |
| 2003/0177006 A1 | 9/2003 | Ichikawa et al. | |
| 2003/0177007 A1 | 9/2003 | Kanazawa et al. | |
| 2003/0182119 A1 | 9/2003 | Junqua et al. | |
| 2004/0030550 A1 | 2/2004 | Liu | |
| 2004/0141418 A1 | 7/2004 | Matsuo et al. | |
| 2004/0230432 A1 | 11/2004 | Liu et al. | |
| 2005/0060153 A1 | 3/2005 | Gable et al. | |
| 2005/0171774 A1 | 8/2005 | Applebaum et al. | |
| 2006/0116874 A1 | 6/2006 | Samuelsson et al. | |
| 2006/0171571 A1 | 8/2006 | Chan et al. | |
| 2007/0055517 A1 | 3/2007 | Spector | |
| 2007/0129941 A1 | 6/2007 | Tavares | |
| 2007/0185718 A1 | 8/2007 | Di Mambro et al. | |
| 2007/0233483 A1 | 10/2007 | Kuppuswamy et al. | |
| 2007/0250920 A1 | 10/2007 | Lindsay | |
| 2008/0071532 A1 | 3/2008 | Ramakrishnan et al. | |
| 2008/0082510 A1 | 4/2008 | Wang et al. | |
| 2008/0223646 A1 | 9/2008 | White | |
| 2008/0262382 A1 | 10/2008 | Akkermans et al. | |
| 2008/0285813 A1 | 11/2008 | Holm | |
| 2009/0087003 A1 | 4/2009 | Zurek et al. | |
| 2009/0105548 A1 | 4/2009 | Bart | |
| 2009/0167307 A1 | 7/2009 | Kopp | |
| 2009/0232361 A1 | 9/2009 | Miller | |
| 2009/0281809 A1 | 11/2009 | Reuss | |
| 2009/0319270 A1 | 12/2009 | Gross | |
| 2010/0004934 A1 | 1/2010 | Hirose et al. | |
| 2010/0076770 A1 | 3/2010 | Ramaswamy | |
| 2010/0204991 A1 | 8/2010 | Ramakrishnan et al. | |
| 2010/0328033 A1 | 12/2010 | Kamei | |
| 2011/0051907 A1 | 3/2011 | Jaiswal et al. | |
| 2011/0142268 A1 * | 6/2011 | Iwakuni | H04R 25/43 381/312 |
| 2011/0246198 A1 | 10/2011 | Asenjo et al. | |
| 2011/0276323 A1 | 11/2011 | Seyfetdinov | |
| 2011/0314530 A1 | 12/2011 | Donaldson | |
| 2011/0317848 A1 | 12/2011 | Ivanov et al. | |
| 2012/0110341 A1 | 5/2012 | Beigi | |
| 2012/0223130 A1 | 9/2012 | Knopp et al. | |
| 2012/0224456 A1 | 9/2012 | Visser et al. | |
| 2012/0249328 A1 | 10/2012 | Xiong | |
| 2012/0323796 A1 | 12/2012 | Udani | |
| 2013/0024191 A1 | 1/2013 | Krutsch et al. | |
| 2013/0058488 A1 | 3/2013 | Cheng et al. | |
| 2013/0080167 A1 | 3/2013 | Mozer | |
| 2013/0225128 A1 | 8/2013 | Gomar | |
| 2013/0227678 A1 | 8/2013 | Kang | |
| 2013/0247082 A1 | 9/2013 | Wang et al. | |
| 2013/0279297 A1 | 10/2013 | Wulff et al. | |
| 2013/0279724 A1 | 10/2013 | Stafford et al. | |
| 2013/0289999 A1 | 10/2013 | Hymel | |
| 2014/0059347 A1 | 2/2014 | Dougherty et al. | |
| 2014/0149117 A1 | 5/2014 | Bakish et al. | |
| 2014/0172430 A1 | 6/2014 | Rutherford et al. | |
| 2014/0188770 A1 | 7/2014 | Agrafioti et al. | |
| 2014/0237576 A1 | 8/2014 | Zhang et al. | |
| 2014/0241597 A1 | 8/2014 | Leite | |

(56) References Cited

U.S. PATENT DOCUMENTS

| | | |
|---|---|---|
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2015/0006163 A1 | 1/2015 | Liu et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcek et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1* | 1/2016 | Lee ..................... G01R 33/02 381/303 |
| 2016/0026781 A1 | 1/2016 | Boczek |
| 2016/0066113 A1 | 3/2016 | Elkhatib et al. |
| 2016/0071516 A1 | 3/2016 | Lee et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1* | 5/2017 | Bakish .................. H04R 1/326 |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0242990 A1* | 8/2017 | Chien ..................... H04L 9/32 |
| 2017/0243597 A1 | 8/2017 | Braasch |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1* | 3/2018 | Pellom ..................... G06F 21/32 |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1 | 10/2019 | Aumer et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0204937 A1 | 6/2020 | Lesso |
| 2020/0227071 A1 | 7/2020 | Lesso |
| 2020/0286492 A1 | 9/2020 | Lesso |

FOREIGN PATENT DOCUMENTS

| | | |
|---|---|---|
| CN | 104252860 A | 12/2014 |
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |

(56) References Cited

FOREIGN PATENT DOCUMENTS

| | | |
|---|---|---|
| CN | 106297772 A | 1/2017 |
| CN | 106531172 A | 3/2017 |
| CN | 107251573 A | 10/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019008387 A1 | 1/2019 |
| WO | 2019008389 A1 | 1/2019 |
| WO | 2019008392 A1 | 1/2019 |

OTHER PUBLICATIONS

Wu et al., LVID: A Multimodal Biometrics Authentication System on Smartphones, IEEE: Transactions on Information Forensics and Security, vol. 15, 2020, pp. 1572-1585 (Year: 2020).*
Wang et al, VoicePop: A Pop Noise based Anti-spoofing System for Voice Authentication on Smartphones, IEEE Infocom 2019—IEEE Conference on Computer Communications, Apr. 29-May 2, 2019, pp. 2062-2070 (Year: 2019).*
Ohtsuka, Takahiro and Kasuya, Hideki, Robust ARX Speech Analysis Method Taking Voice Source Pulse Train nto Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-independent Speaker Verification: An Initial Database, Comparison of Countermeasures, and Human

(56) References Cited

OTHER PUBLICATIONS

Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801664.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference On Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: Jun. 5, 2017.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
International Search Report and Written Opinion of the International Searching Authority, International Application No. PCT/GB2019/052143, dated Sep. 17, 2019.
Lucas, Jim, What is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
First Office Action, China National Intellectual Property Administration, Application No. 2018800720846, dated Mar. 1, 2021.
Examination Report under Section 18(3), UKIPO, Application No. GB1918956.2, dated Jul. 29, 2021.
Examination Report under Section 18(3), UKIPO, Application No. GB1918965.3, dated Aug. 2, 2021.

* cited by examiner

MAGNETIC DETECTION OF REPLAY ATTACK

The present disclosure is a continuation of U.S. patent application Ser. No. 16/020,406, filed Jun. 27, 2018, which claims priority to U.S. Provisional Patent Application Ser. No. 62/526,034, filed Jun. 28, 2017, each of which is incorporated by reference herein in its entirety.

TECHNICAL FIELD

Embodiments described herein relate to methods and devices for detecting a replay attack on a voice biometrics system.

BACKGROUND

Voice biometrics systems are becoming widely used. In such a system, a user trains the system by providing samples of their speech during an enrolment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to an aspect of the present invention, there is provided a method of detecting a replay attack on a voice biometrics system. The method comprises: receiving an audio signal representing speech; detecting a magnetic field; determining if there is a correlation between the audio signal and the magnetic field; and if there is a correlation between the audio signal and the magnetic field, determining that the audio signal may result from a replay attack.

Determining if there is a correlation between the audio signal and the magnetic field may comprise: identifying first periods during which the audio signal contains speech; identifying second periods during which the magnetic field differs from a baseline; and determining if the first and second periods are substantially the same.

The method may comprise determining that the first and second periods are substantially the same if more than 60% of the first periods during which the audio signal contains speech overlap with second periods during which the magnetic field differs significantly from a baseline, and/or more than 60% of the second periods during which the magnetic field differs significantly from a baseline overlap with first periods during which the audio signal contains speech. The method may comprise determining that the first and second periods are substantially the same if or more than 80% of the first periods during which the audio signal contains speech overlap with second periods during which the magnetic field differs significantly from a baseline, and/or more than 80% of the second periods during which the magnetic field differs significantly from a baseline overlap with first periods during which the audio signal contains speech.

Determining if there is a correlation between the audio signal and the magnetic field may comprise: sampling the detected magnetic field at a first sample rate; sampling the audio signal at a second sample rate; and determining if there is a correlation between the sampled audio signal and the sampled detected magnetic field.

The method may comprise: receiving a series of values of a signal representing a magnetic field strength; forming an average value of the magnetic field strength over a period of time; and subtracting the average value of the magnetic field strength from the series of values of the signal representing the magnetic field strength to form said detected magnetic field.

The method may comprise: obtaining a digital audio signal at a third sample rate, and undersampling said digital audio signal to form said audio signal at said second sample rate.

The second sample rate may be approximately equal to said sample rate.

The step of determining if there is a correlation between the sampled audio signal and the sampled detected magnetic field comprises performing a mathematical correlation operation on the sampled audio signal and the sampled detected magnetic field to obtain an output correlation function, and determining if a peak value of the output correlation function exceeds a predetermined threshold.

The method may further comprise: determining a direction of a source of said audio signal representing speech; determining a direction of a source of said magnetic field; and determining that the audio signal may result from a replay attack if the direction of the source of said audio signal representing speech corresponds to the direction of the source of said magnetic field.

According to an aspect of the present invention, there is provided a system for detecting a replay attack on a voice biometrics system, the system being configured for: receiving an audio signal representing speech; detecting a magnetic field; determining if there is a correlation between the audio signal and the magnetic field; and, if there is a correlation between the audio signal and the magnetic field, determining that the audio signal may result from a replay attack.

The system may be configured for determining if there is a correlation between the audio signal and the magnetic field by: identifying first periods during which the audio signal contains speech; identifying second periods during which the magnetic field differs from a baseline; and determining if the first and second periods are substantially the same.

The system may be configured for determining that the first and second periods are substantially the same if more than 60% of the first periods during which the audio signal contains speech overlap with second periods during which the magnetic field differs significantly from a baseline, and/or more than 60% of the second periods during which the magnetic field differs significantly from a baseline overlap with first periods during which the audio signal contains speech.

The system may be configured for determining that the first and second periods are substantially the same if or more than 80% of the first periods during which the audio signal contains speech overlap with second periods during which the magnetic field differs significantly from a baseline, and/or more than 80% of the second periods during which the magnetic field differs significantly from a baseline overlap with first periods during which the audio signal contains speech.

The system may be configured for determining if there is a correlation between the audio signal and the magnetic field by: sampling the detected magnetic field at a first sample rate; sampling the audio signal at a second sample rate; and determining if there is a correlation between the sampled audio signal and the sampled detected magnetic field.

The system may be configured for: receiving a series of values of a signal representing a magnetic field strength; forming an average value of the magnetic field strength over a period of time; and subtracting the average value of the magnetic field strength from the series of values of the signal representing the magnetic field strength to form said detected magnetic field.

The system may be configured for: obtaining a digital audio signal at a third sample rate, and undersampling said digital audio signal to form said audio signal at said second sample rate.

The second sample rate may be approximately equal to said sample rate.

The system may be configured for determining if there is a correlation between the sampled audio signal and the sampled detected magnetic field by performing a mathematical correlation operation on the sampled audio signal and the sampled detected magnetic field to obtain an output correlation function, and determining if a peak value of the output correlation function exceeds a predetermined threshold.

The system may be further configured for: determining a direction of a source of said audio signal representing speech; determining a direction of a source of said magnetic field; and determining that the audio signal may result from a replay attack if the direction of the source of said audio signal representing speech corresponds to the direction of the source of said magnetic field.

According to an aspect of the present invention, there is provided a method of detecting a replay attack on a voice biometrics system. The method comprises: receiving an audio signal representing speech; detecting a magnetic field; and if a strength of the magnetic field exceeds a threshold value, determining that the audio signal may result from a replay attack.

According to an aspect of the present invention, there is provided a system for detecting a replay attack on a voice biometrics system, the system being configured for: receiving an audio signal representing speech; detecting a magnetic field; and if a strength of the magnetic field exceeds a threshold value, determining that the audio signal may result from a replay attack.

According to an aspect of the present invention, there is provided a method of detecting a replay attack on a voice biometrics system. The method comprises: receiving an audio signal representing speech; determining a direction of a source of said audio signal representing speech; detecting a magnetic field; determining a direction of a source of said magnetic field; and determining that the audio signal may result from a replay attack if the direction of the source of said audio signal representing speech corresponds to the direction of the source of said magnetic field.

The method may comprise receiving the audio signal representing speech from multiple microphones.

The method may comprise detecting components of the magnetic field in three orthogonal directions.

According to an aspect of the present invention, there is provided a system for detecting a replay attack on a voice biometrics system, the system being configured for: receiving an audio signal representing speech; determining a direction of a source of said audio signal representing speech; detecting a magnetic field; determining a direction of a source of said magnetic field; and determining that the audio signal may result from a replay attack if the direction of the source of said audio signal representing speech corresponds to the direction of the source of said magnetic field.

The system may be configured for receiving the audio signal representing speech from multiple microphones.

The system may be configured for detecting components of the magnetic field in three orthogonal directions.

According to an aspect of the present invention, there is provided a device comprising a system according to any of the above aspects. The device may comprise a mobile telephone, an audio player, a video player, a mobile computing platform, a games device, a remote controller device, a toy, a machine, or a home automation controller or a domestic appliance.

According to an aspect of the present invention, there is provided a computer program product, comprising a computer-readable tangible medium, and instructions for performing a method according to any one of the previous aspects.

According to an aspect of the present invention, there is provided a non-transitory computer readable storage medium having computer-executable instructions stored thereon that, when executed by processor circuitry, cause the processor circuitry to perform a method according to any one of the previous aspects.

According to an aspect of the present invention, there is provided a device comprising said non-transitory computer readable storage medium. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
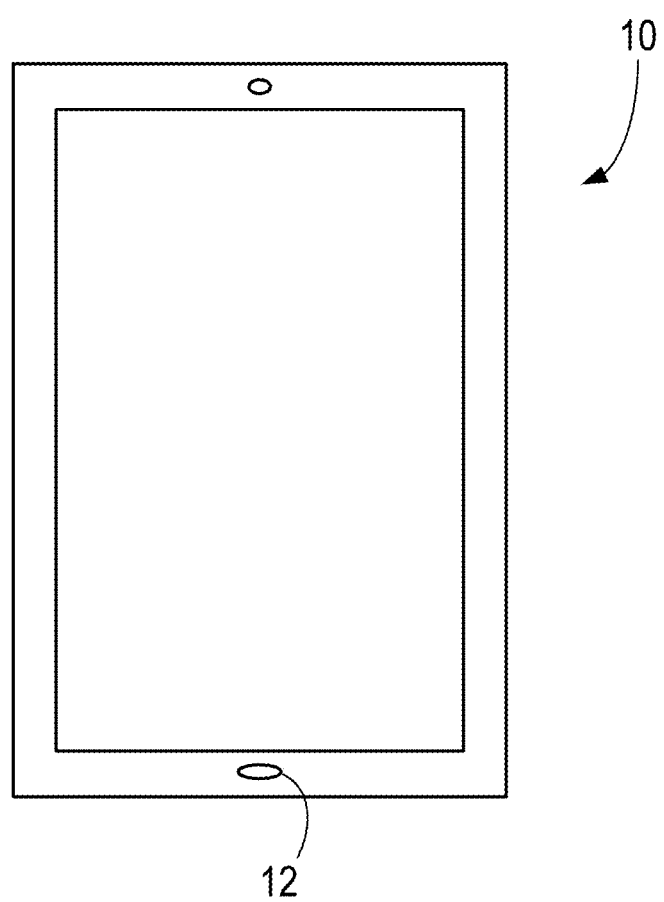
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10.

Figure 2:
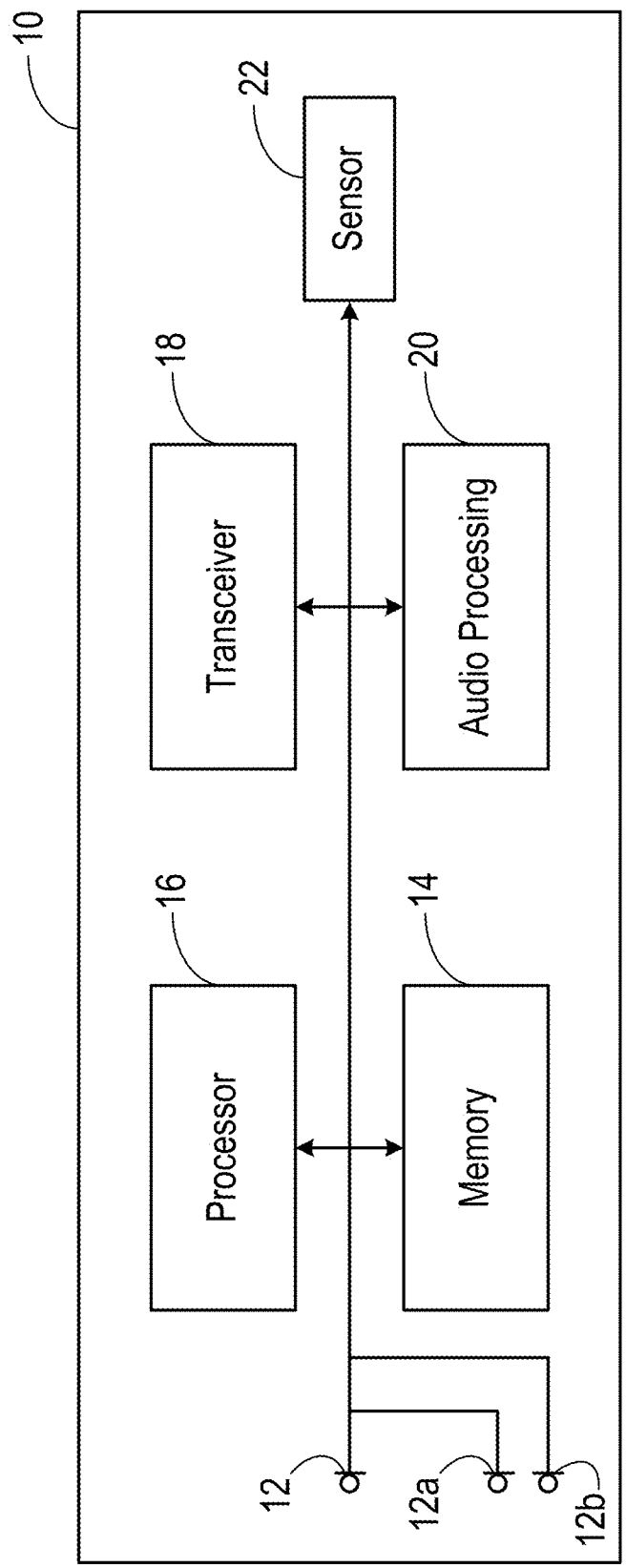
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

FIG. 2 also shows at least one sensor 22. In embodiments of the present invention, the sensor is a magnetic field sensor for detecting a magnetic field. For example, the sensor 22 may be a Hall effect sensor, that is able to provide separate measurements of the magnetic field strength in three orthogonal directions.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

One attempt to deceive a voice biometric system is to play a recording of an enrolled user's voice in a so-called replay or spoof attack.

Figure 3:
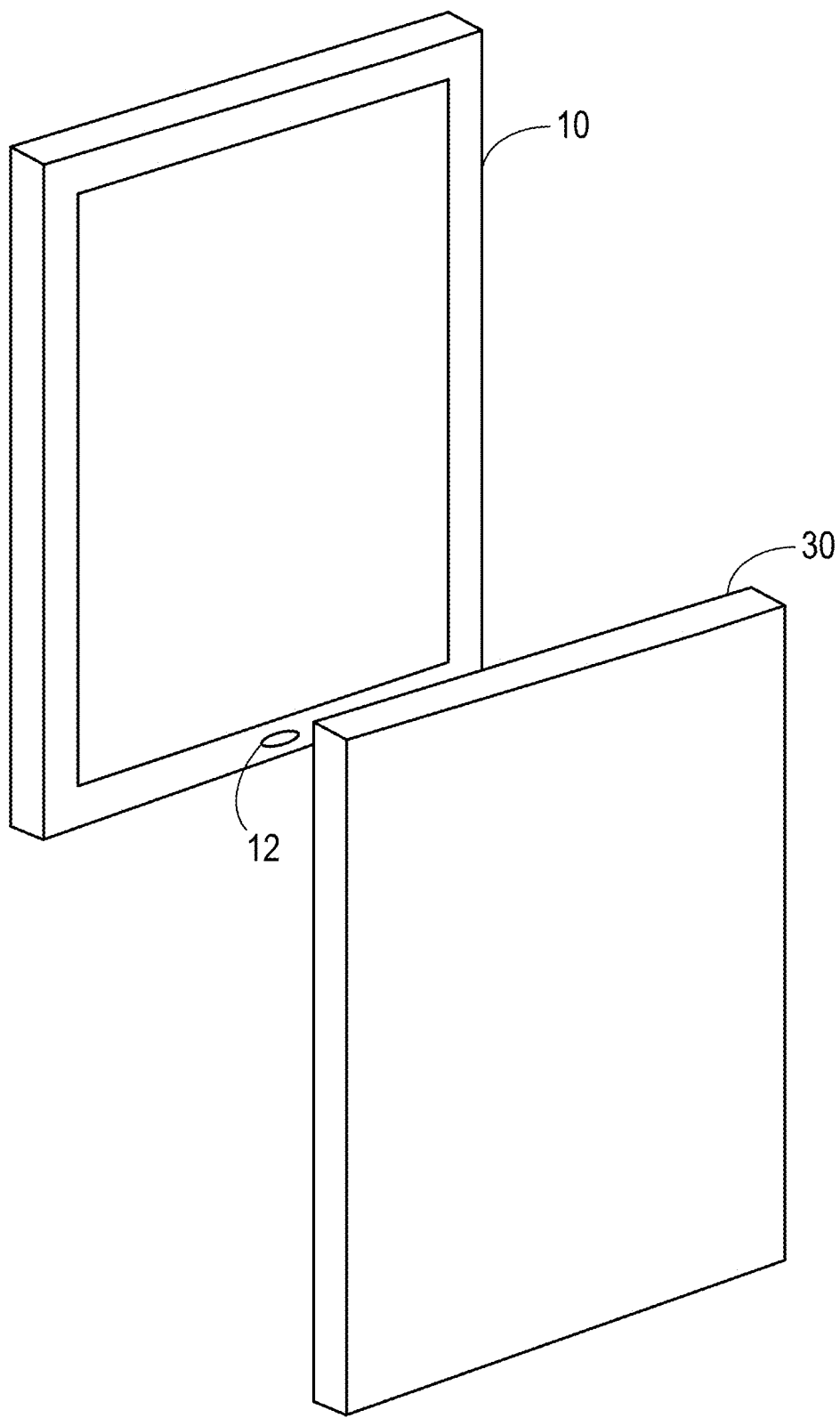
FIG. 3 illustrates a first situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to detect that the enrolled user's voice that it detects is a recording, the attacker will gain access to one or more services that are intended to be accessible only by the enrolled user.

It is known that smartphones, such as the smartphone 30, are typically provided with loudspeakers that are of relatively low quality due to size constraints. Thus, the recording of an enrolled user's voice played back through such a loudspeaker will not be a perfect match with the user's voice, and this fact can be used to identify replay attacks. For example, loudspeakers may have certain frequency characteristics, and if these frequency characteristics can be detected in a speech signal that is received by the voice biometrics system, it may be considered that the speech signal has resulted from a replay attack.

Figure 4:
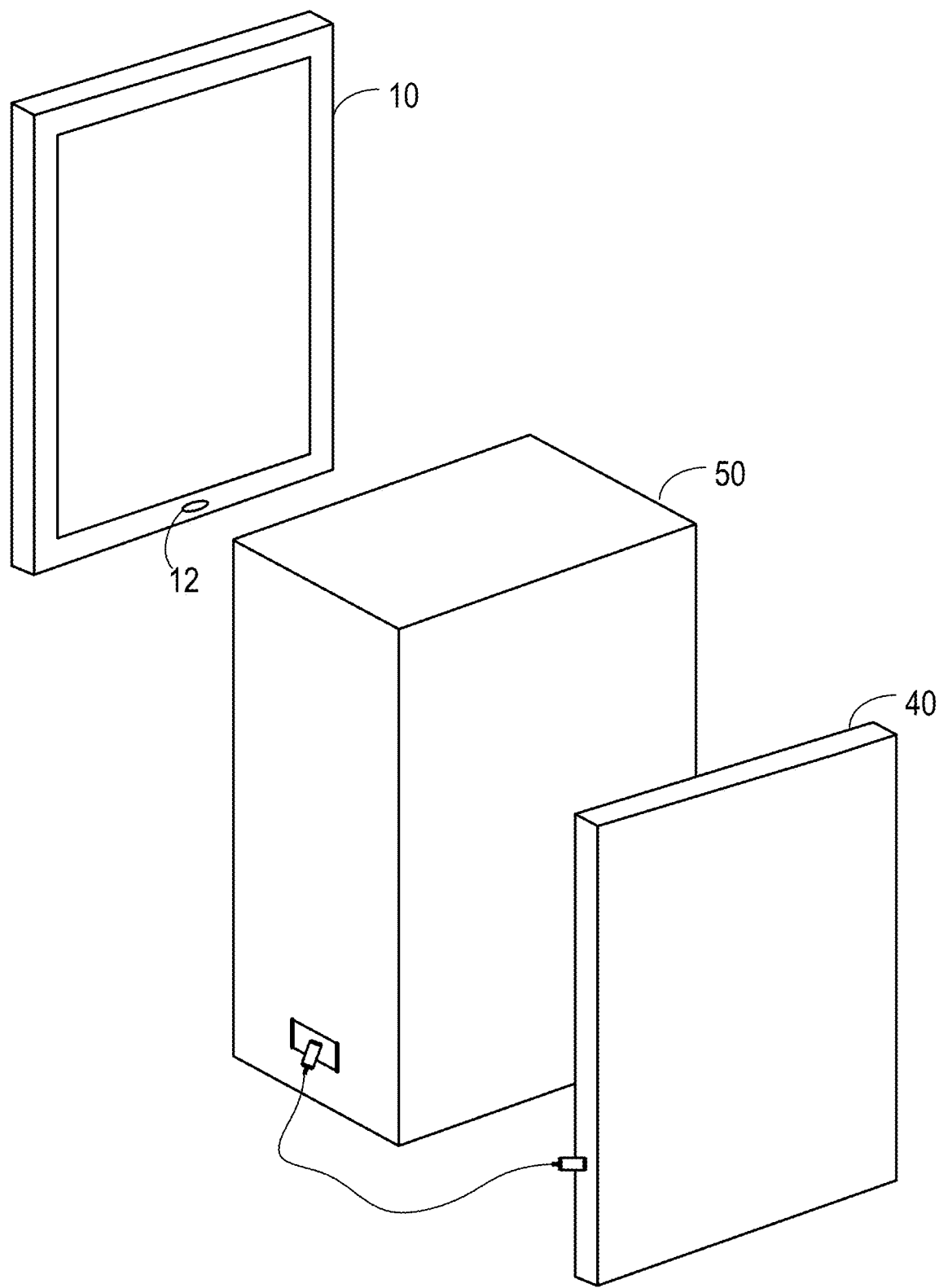
FIG. 4 illustrates a second situation in which a replay attack is being performed.

FIG. 4 shows a second example of a situation in which a replay attack is being performed, in an attempt to overcome the method of detection described above. Thus, in FIG. 4, the smartphone 10 is provided with voice biometric functionality. Again, in this example, the smartphone 10 is in the possession, at least temporarily, of an attacker, who has another smartphone 40. The smartphone 40 has been used to record the voice of the enrolled user of the smartphone 10.

In this example, the smartphone 40 is connected to a high quality loudspeaker 50. Then, the microphone inlet 12 of the smartphone 10 is positioned close to the loudspeaker 50, and the recording of the enrolled user's voice is played back through the loudspeaker 50. As before, if the voice biometric system is unable to detect that the enrolled user's voice that it detects is a recording, the attacker will gain access to one or more services that are intended to be accessible only by the enrolled user.

In this example, the loudspeaker 50 may be of high enough quality that the recording of the enrolled user's voice played back through the loudspeaker will not be reliably distinguishable from the user's voice, and so the audio features of the speech signal cannot be used to identify the replay attack.

However, it is appreciated that many loudspeakers, and particularly high quality loudspeakers, are electromagnetic loudspeakers in which an electrical audio signal is applied to a voice coil, which is located between the poles of a permanent magnet, causing the coil to move rapidly backwards and forwards. This movement causes a diaphragm attached to the coil to move backwards and forwards, creating sound waves. It is recognised here that, if a device such as the smartphone 10 is positioned close to a loudspeaker while it is playing back sounds, there will be corresponding changes in the magnetic field, which will be detectable by a magnetic field sensor 22.

Figure 5:
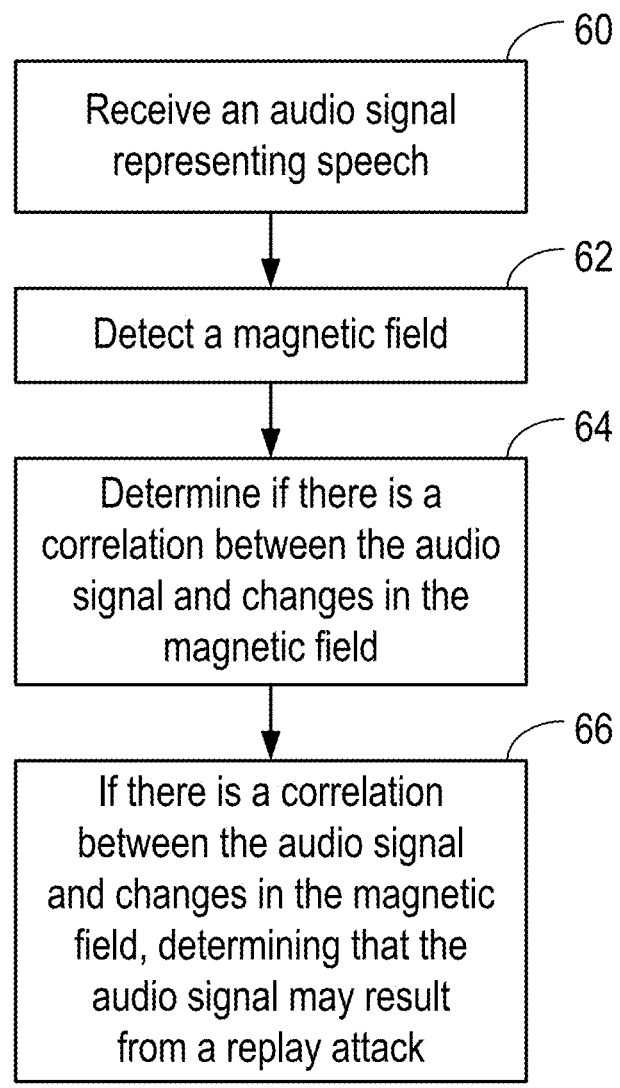
FIG. 5 is a flow chart illustrating a method in accordance with the invention.
Figure 6:
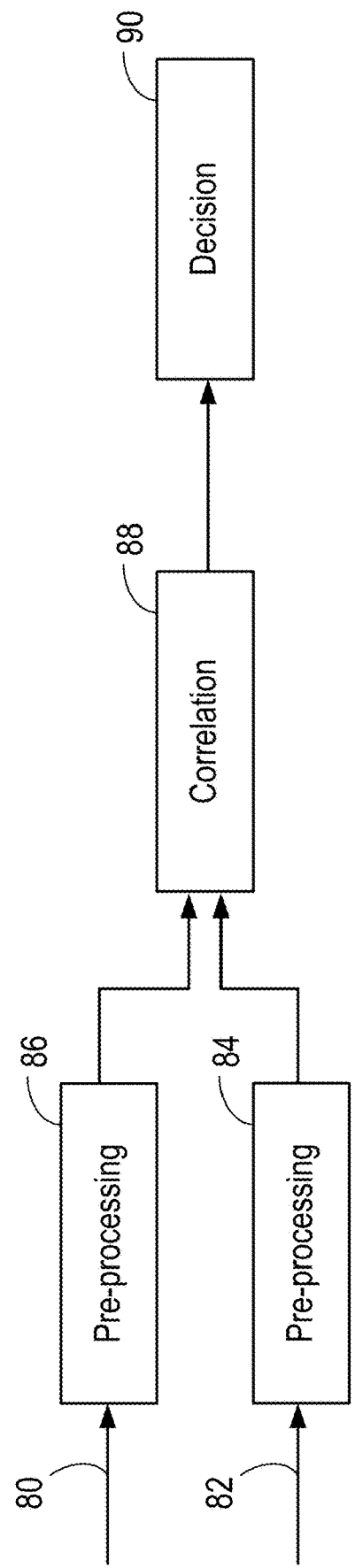
FIG. 6 is a block diagram of a system for implementing one method.

FIG. 5 is a flow chart, illustrating a method of detecting a replay attack on a voice biometrics system, and FIG. 6 is a block diagram illustrating functional blocks in the voice biometrics system.

Specifically, in step 60 in the method of FIG. 5, an audio signal is received on an input 80 of the system shown in FIG. 6. For example, in a device as shown in FIG. 2, the audio signal received on the input 80 may be the audio signal detected by the microphone 12, or may be the sum of the audio signals detected by the microphones if there is more than one.

At the same time, in step 62 in the method of FIG. 5, an input signal is received on an input 82 of the system shown in FIG. 6. The input signal received on the input 82 is received from a magnetometer. For example, when the method is performed in a device such as a smartphone or a tablet computer, the device will typically include a three-axis magnetometer, which generates an output signal containing separate measurements of the magnetic field strength in three orthogonal directions.

In some embodiments, the input signal received from the magnetometer is passed to a first pre-processing block 84. For example, if the signal received from the magnetometer contains separate measurements of the magnetic field strength in three orthogonal directions, these can be combined to provide a single measurement of the magnetic field strength. The measurement of the magnetic field strength could be found as the square root of the sum of the squares of the three separate measurements of the magnetic field strength in the three orthogonal directions.

Further, the aim of the system is to determine any magnetic field that is generated by a nearby object such as a loudspeaker. In order to obtain the most useful information about this, one possibility is to process the input signal received from the magnetometer in order to remove the effects of the Earth's magnetic field. For example, this can be achieved by forming an average value of the magnetic field strength, for example over a period of at least several seconds, and possibly several minutes or hours, and subtracting this from each individual measurement to obtain an instantaneous measurement of the magnetic field generated by artificial sources. When the measurements of the magnetic field strength in three orthogonal directions are considered separately, these values will depend heavily on the orientation of the device in the Earth's magnetic field. The orientation can be determined from the signals generated by accelerometers present in the device, and so the orientation can be taken into account when determining the artificial magnetic field that is generated by a nearby object such as a loudspeaker.

Typically, in a smartphone, a magnetometer generates a digital signal, with a sampling rate in the region of 80-120 Hz, which can be applied as the input signal on the input 82 of the system.

In some embodiments, the audio signal received on the input 80 is passed to a second pre-processing block 86. For example, if the audio signal is received in an analog form, the pre-processing block 86 may comprise an analog-to-digital converter for converting the signal to a digital form.

In some embodiments, the pre-processing block 86 may comprise a digital or analog filter for correcting for expected non-linearities in the frequency response of a loudspeaker whose presence is being detected. Thus, the relationship between the magnetic field and the frequency in a typical loudspeaker will have a notch shape, that is, at one particular frequency around the mechanical resonance of the speaker, the magnetic field will be particularly low. The pre-processing block 86 may then apply a filter having a similar characteristic to the received audio signal, in order to improve a degree of correlation between the audio signal and the magnetic field.

In this illustrated embodiment, the second pre-processing block 86 comprises a decimation block. If the analog-to-digital converter in the second pre-processing block 86 generates a digital audio signal at a sampling rate that exceeds the sampling rate of the magnetometer signal, then samples of the digital audio signal are discarded, so that the resulting sample rate is approximately equal to the sampling rate, R, of the magnetometer signal, for example the audio sampling rate should be in the range 0.5 R-2 R, more preferably 0.8 R-1.2 R. For example, if the input signal received from the magnetometer has a sampling rate in the region of 80-120 Hz, and the analog-to-digital converter in the second pre-processing block 86 has a sampling rate of 40 kHz (as would be typical for an analog-to-digital converter that would typically be present in a device such as a smartphone, and could be used for an accurate digital representation of an analog audio signal), then only one in every 400 samples of the analog-to-digital converter would be retained, so that the resulting sample rate is 40 kHz/400=100 Hz.

Alternatively, the magnetometer signal may be upsampled to the sampling rate of the audio signal, by interleaving zero-value samples between the samples of the magnetometer signal.

In step 64 in the method of FIG. 5, it is determined whether there is a correlation between the audio signal and the magnetic field. Thus, in FIG. 6 the outputs of the first and second pre-processing blocks 84, 86 are passed to a correlation block 88.

The correlation block 88 can operate in different ways.

Figure 7:
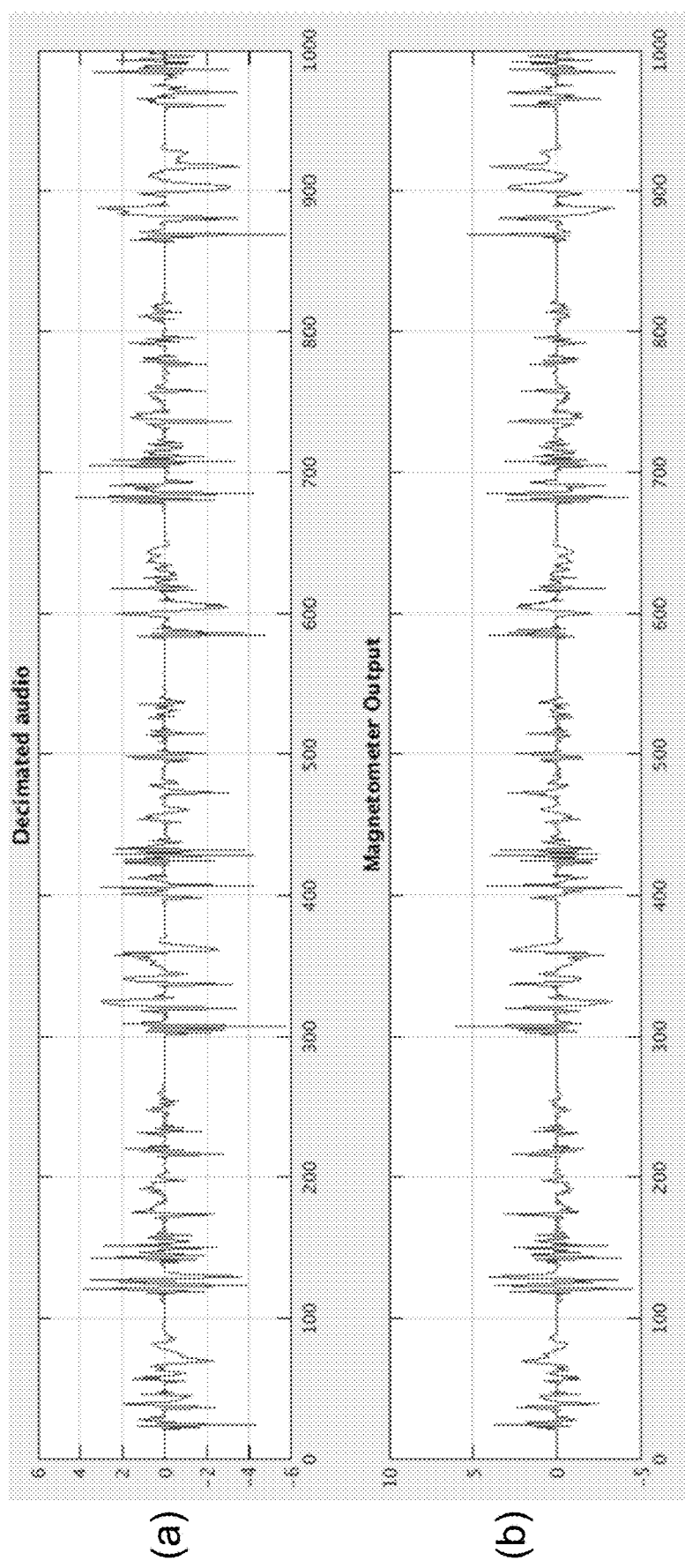
FIG. 7 illustrates a result of a method.

FIG. 7 illustrates a first method of determining whether there is a correlation between the audio signal and the magnetic field.

Thus, FIG. 7(*a*) illustrates the form of the decimated audio signal generated by the second pre-processing block 86, while FIG. 7(*b*) illustrates the form of the magnetometer output. In both FIG. 7(*a*) and FIG. 7(*b*), the horizontal axes represent time. More specifically, the units on the horizontal axes are samples of the respective digital samples. In each case, the sample rate is ≈100 Hz, and so 1000 samples is ≈10 seconds. In both FIG. 7(*a*) and FIG. 7(*b*), the vertical axes represent the strengths of the respective signals, in arbitrary units. In the case of FIG. 7(*b*), the effect of the Earth's magnetic field has been removed by forming an average value of the magnetic field strength, for example over a period of several seconds. This average value is then taken as a baseline, and subtracted from each individual measurement. FIG. 7(*b*) then shows these individual measurements as differences from that baseline, representing an instantaneous measurement of the magnetic field generated by artificial sources.

In this example, the sample rate of the decimated audio signal generated by the second pre-processing block 86 is exactly the same as the sample rate of the magnetometer output. Therefore, FIG. 7, which shows equal numbers of samples of both signals, covers equal periods of time for both inputs.

It can be seen that the audio signal contains a noticeable input during periods from about samples 15-85, samples 115-260, samples 300-365, samples 395-545, etc. For example, it may be determined that the audio signal contains a relevant input when the magnitude of a sample value exceeds a threshold value, or when a sample value magnitude, averaged over a relatively small number of samples, exceeds a threshold value. It can therefore be assumed that the user's speech is present during the periods of time during which these samples were taken.

It can also be seen that the magnetometer output also contains a noticeable input during the same periods. For example, it may be determined that the magnetometer output contains a relevant input when the magnitude of a sample value exceeds a threshold value, or when a sample value magnitude, averaged over a relatively small number of samples, exceeds a threshold value. It can therefore be assumed the device was in the presence of a loudspeaker that was generating sounds during the periods of time during which these samples were taken.

If the device was in the presence of a loudspeaker that was generating sounds at the same time as the microphone was detecting speech, then this may suggest that the speech was being played by the loudspeaker, and hence that the device was the object of a replay attack.

The correlation block 88 may therefore identify first periods during which the audio signal contains speech, and may identify second periods during which there is a significant magnetic field.

In step 66 in the method of FIG. 5, it is determined whether the audio signal may result from a replay attack. Thus, in FIG. 6 the results of the determinations of the correlation block 88 are passed to a decision block 90, which determines if the first and second periods are substantially the same. If so, it is determined that the audio signal may result from a replay attack.

For example, the decision block 90 may determine that the first and second periods are substantially the same if more than 60% of the first periods during which the audio signal contains speech overlap with second periods during which there is a significant magnetic field, and/or more than 60% of the second periods during which there is a significant magnetic field overlap with first periods during which the audio signal contains speech, or more than 80% of the first periods during which the audio signal contains speech overlap with second periods during which there is a significant magnetic field, and/or more than 80% of the second periods during which there is a significant magnetic field overlap with first periods during which the audio signal contains speech.

Figure 8:
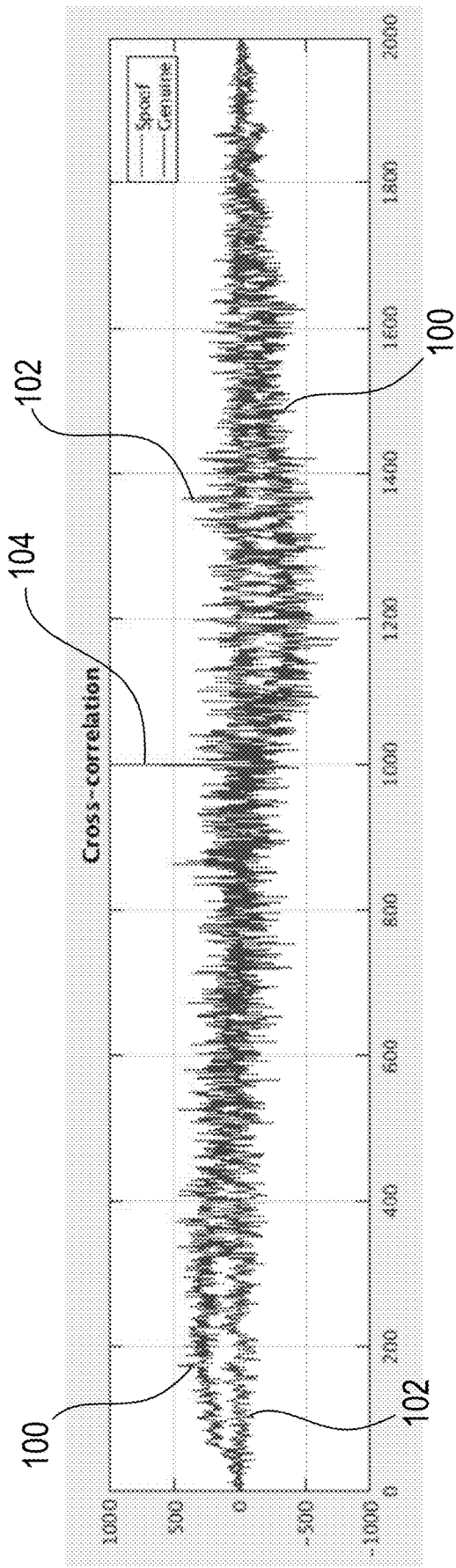
FIG. 8 illustrates a result of a second method.

The method illustrated in FIG. 7 is particularly effective when the audio signal and the magnetometer output are not subject to large amounts of noise. FIG. 8 illustrates a second method of determining whether there is a correlation between the audio signal and the magnetic field.

This second method forms the mathematical cross-correlation between the decimated audio signal generated by the second pre-processing block 86 and the samples of the magnetometer output. That is, the sequence of samples in one of the signals is correlated with a delayed copy of the other signal, for a range of delay values. The degree of correlation will be a function of the delay, which can conveniently be measured by the number of sample periods by which the delayed version has been delayed. Conventionally, autocorrelations are performed on the two signals, and the size of the correlation for any delay value is normalised against the sizes of the autocorrelations of the two signals at zero delay.

Thus, the correlation $R_{xy}[n]$ between the two signals $x[m]$ and $y[m]$, as a function of the number of samples, n, by which the second signal is delayed, is given by:

$$R_{xy}[n] = \sum_{m=-\infty}^{\infty} x*[m]y[n+m]$$

and, after normalisation:

$$r_{xy}[n] = \frac{R_{xy}[n]}{\sqrt{R_{xx}[0]R_{yy}[0]}}$$

FIG. 8 illustrates the result of obtaining the cross-correlation in one illustrative example. Specifically, the trace 100 shows the result obtained when the audio input is obtained from a live user's speech, while the trace 102 shows the result obtained when the audio input is obtained by a playback of the user's speech through a loudspeaker.

It can be seen that the trace 100 fluctuates, but there is no clear pattern. The trace 102 fluctuates in a similar way, but it is noticeable that, at one or two particular delay values 104, there is a very high degree of correlation. These particular delay values correspond to a delay of zero, that is, the two signals are correlated.

This can be assumed to be a consequence of the fact that the audio input is obtained by a playback of the user's speech through a loudspeaker, and hence that the loudspeaker is generating a magnetic field in synchronisation with the sounds that it is generating.

This method picks out the correlation, even when either or both of the audio signal and the magnetometer output contain significant amounts of noise.

In step 66 in the method of FIG. 5, it is determined on the basis of the correlation whether the audio signal may result from a replay attack. Thus, in FIG. 6 the results of the determinations of the correlation block 88 are passed to a decision block 90, which determines if the correlation is such that it should be determined that the audio signal may result from a replay attack. For example, in some embodiments the decision block 90 determines that the audio signal may result from a replay attack if the peak value of the cross-correlation (or, in particular, the peak value of the cross-correlation, which may occur at a delay value corresponding to synchronisation of the audio input and the measured magnetic field) exceeds a threshold value. FIG. 8 shows the result of performing the cross-correlation on one frame of data (for example comprising 1000 samples or about 10 seconds) of data. Where the input signal continues for longer than this, the decision block 90 may determine that the audio signal may result from a replay attack by considering multiple frames of data, for example by determining that the audio signal may have resulted from a replay attack if the peak value of the cross-correlation exceeds a threshold value in every frame, or if the peak value of the cross-correlation, averaged over several frames, exceeds a threshold value.

In addition to determining whether the variation in the magnetic field is correlated in time with the variation in the audio signal, it is also possible to determine whether the direction of a source of the magnetic field corresponds to a direction of a source of the audio signal.

Figure 9A:
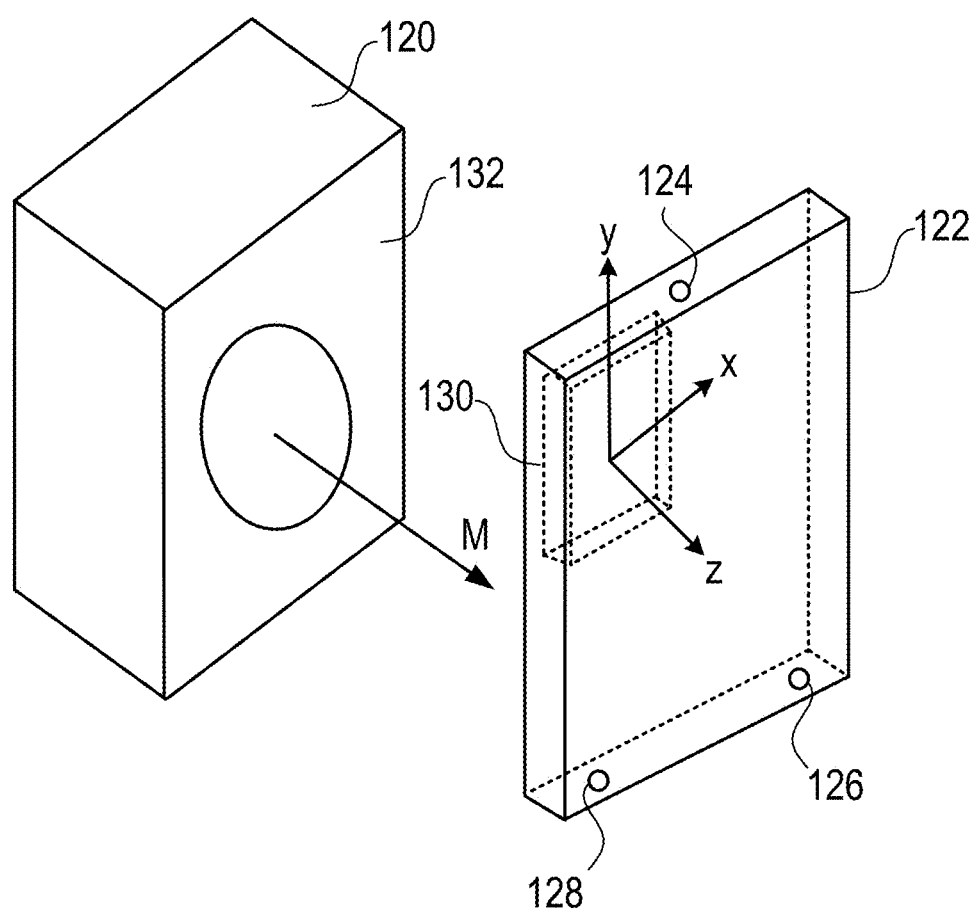
FIG. 9(*a*) and FIG. 9(*b*) illustrate further situations in which a replay attack is being performed.
Figure 9B:
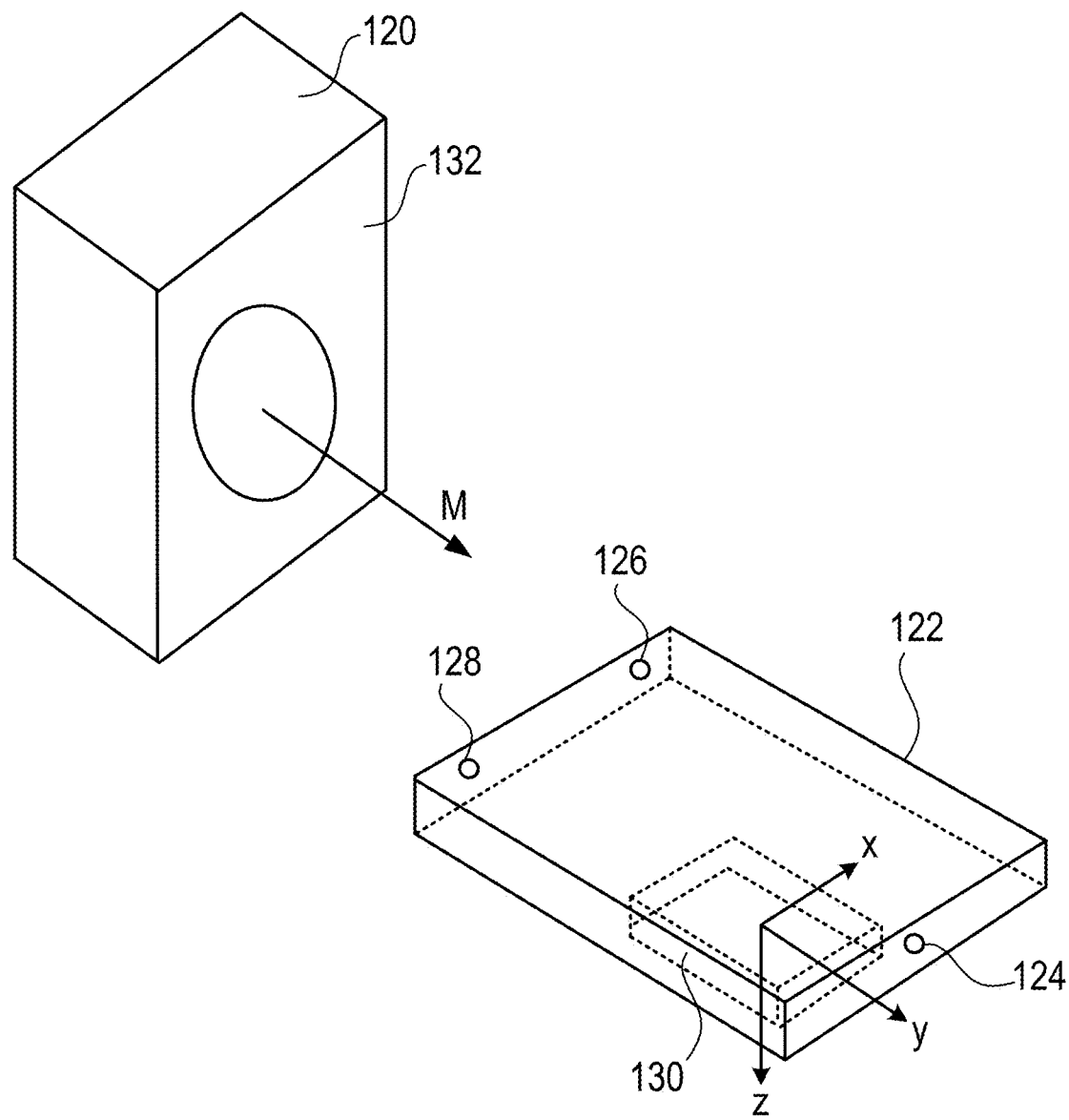

FIGS. 9(*a*) and 9(*b*) illustrates how this can be done. Specifically, FIGS. 9(*a*) and 9(*b*) illustrate two further situations in which a replay attack is being performed.

FIG. 9(*a*) shows a situation with a loudspeaker 120 placed on a surface, and a smartphone 122 being held vertically in front of the loudspeaker and facing it. The smartphone 122 is shown partially in section, so that internal components of the smartphone can be shown.

Specifically, FIG. 9(*a*) shows three microphones 124, 126, and 128 located respectively near the centre of the top edge of the smartphone, near the bottom left corner of the smartphone (as the user looks at the front of the smartphone), and near the bottom right corner of the smartphone.

In addition, FIG. 9(*a*) shows a three-axis magnetometer 130, which produces separate measurements of the magnetic field strengths in the x, y, and z directions as shown in FIG. 9(*a*).

The loudspeaker 120 is an electromagnetic loudspeaker, in which sound is produced by the movement of a coil, with the coil being moved by a magnetic field. As shown in FIG. 9(*a*), the magnetic field M is oriented out of the front face 132 of the loudspeaker 120. Provided that the smartphone 122 is positioned sufficiently close to the front of the loudspeaker 120, it can be assumed that the direction of the magnetic field sensed by the magnetometer 130 will be generally in the z direction. Thus, if the measurements of the magnetic field strengths in the x, y, and z directions show that the magnetic field in the z direction is predominant, then it can be assumed that the smartphone 122 is positioned close to the front of the loudspeaker 120 in the orientation illustrated in FIG. 9(*a*).

The signals received from the three microphones 124, 126, 128 can also be used to determine the direction of the source of the audio signal, by using known techniques. For example, in the situation shown in FIG. 9(*a*), the audio signal generated by the loudspeaker 120 will be received by the three microphones 124, 126, 128 at essentially the same time. This can be used to determine the approximate direction in which the source of the audio signal is located.

Thus, in this example, it can be determined that the direction of the source of the magnetic field generally corresponds to the direction of the source of the audio signal. This can be used to provide further confirmation that the audio signal is the result of a replay attack.

FIG. 9(*b*) shows an alternative situation with the loudspeaker 120 placed on a surface, and the smartphone 122 being placed face upwards on the same surface.

In this situation, provided that the smartphone 122 is positioned sufficiently close to the front of the loudspeaker 120, it can be assumed that the direction of the magnetic field sensed by the magnetometer 130 will be generally in the y direction. Thus, if the measurements of the magnetic field strengths in the x, y, and z directions show that the magnetic field in the y direction is predominant, then it can be assumed that the smartphone 122 is positioned close to the front of the loudspeaker 120 in the orientation illustrated in FIG. 9(*b*).

Again, the signals received from the three microphones 124, 126, 128 can also be used to determine the location of the source of the audio signal, by using known techniques. For example, in the situation shown in FIG. 9(*b*), the audio signal generated by the loudspeaker 120 will be received by the two microphones 126, 128 at essentially the same time, and slightly before the audio signal is received by the microphone 124. This can be used to determine the approximate direction in which the source of the audio signal is located.

Thus, again, it can be determined that the source of the magnetic field generally corresponds to the source of the audio signal. This can be used to provide further confirmation that the audio signal is the result of a replay attack.

In other embodiments, the method comprises receiving an audio signal representing speech, and detecting a magnetic field. In these embodiments, if a strength of the magnetic field exceeds a threshold value, it is determined that the audio signal may result from a replay attack. These embodiments are particularly suitable when the replay attack is generated using a loudspeaker that contains a large magnet, and hence the presence of a large magnetic field is indicative of a replay attack. In such cases, the magnetic field strength may be several times, and possibly orders of magnitude, greater than the baseline magnetic field strength caused by the Earth's magnetic field. Therefore, in these cases, it is not necessary to determine the baseline magnetic field strength and subtract it from the individual measurements.

In other embodiments, the method comprises receiving an audio signal representing speech, and detecting a magnetic field. It is possible to determine a direction of a source of said audio signal representing speech, for example using beamforming techniques if the signal is detected using multiple microphones. It is also possible to determine a direction of a source of said magnetic field. If the direction of the source of said audio signal representing speech corresponds to the direction of the source of said magnetic field, it may be determined that the audio signal may result from a replay attack.

Figure 10:
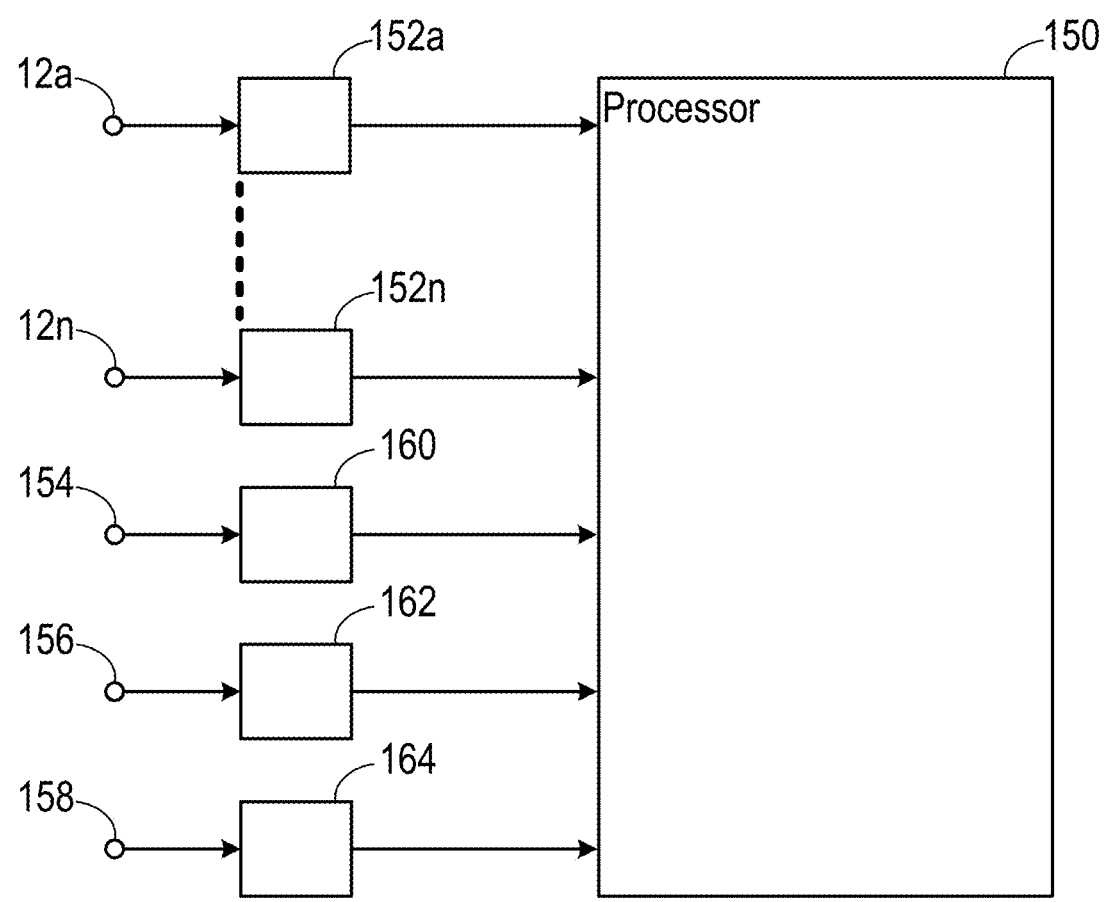
FIG. 10 illustrates a further system for implementing one method.

FIG. 10 illustrates a system for determining whether a direction of a source of a magnetic field generally corresponds to a direction of a source of an audio signal representing speech, whether this result is used as further confirmation that the audio signal is the result of a replay attack, in conjunction with other methods, or whether it is used as the sole indication that the audio signal is the result of a replay attack.

FIG. 10 shows a processor 150. The processor 150 receives input signals from multiple microphones 12*a*, . . . , 12*n*, after suitable conditioning in pre-processing blocks 152*a*, . . . , 152*n*. Similarly, the processor 150 receives separate input signals from the three magnetometers 154, 156, 158 that measure the magnetic field strength in the three orthogonal directions, multiple again after suitable conditioning in pre-processing blocks 160, 162, 164.

The processor 150 may separately calculate the direction of the source of the audio signal, for example using standard beamforming techniques, and the direction of the source of the magnetic field, and may then check for correlation between them.

Alternatively, the processor 150 may be a Neural Network, pre-trained using samples of representative loudspeakers with various orientations relative to the target device.

There are therefore disclosed methods and systems that can be used for detecting situations that may indicate that a received audio signal is the result of a replay attack.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting a replay attack on a voice biometrics system, the method comprising:
    receiving, from a microphone, an audio signal representing speech;
    detecting a magnetic field proximate the microphone;
    determining if there is a correlation between the audio signal and the magnetic field; and
    if there is a correlation between the audio signal and the magnetic field, determining that the audio signal may result from a replay attack from a loudspeaker.

2. A method according to claim 1, wherein determining if there is a correlation between the audio signal and the magnetic field comprises:
    identifying first periods during which the audio signal contains speech;
    identifying second periods during which the magnetic field differs from a baseline; and
    determining if the first and second periods are substantially the same.

3. A method according to claim 2, comprising determining that the first and second periods are substantially the same if more than 60% of the first periods during which the audio signal contains speech overlap with the second periods during which the magnetic field differs significantly from a baseline, and/or more than 60% of the second periods during which the magnetic field differs significantly from a baseline overlap with first periods during which the audio signal contains speech.

4. A method according to claim 3, comprising determining that the first and second periods are substantially the same if more than 80% of the first periods during which the audio signal contains speech overlap with second periods during which the magnetic field differs significantly from a baseline, and/or more than 80% of the second periods during which the magnetic field differs significantly from a baseline overlap with first periods during which the audio signal contains speech.

5. A method according to claim 1, wherein determining if there is a correlation between the audio signal and the magnetic field comprises:
    sampling the detected magnetic field at a first sample rate;
    sampling the audio signal at a second sample rate; and
    determining if there is a correlation between the sampled audio signal and the sampled detected magnetic field.

6. A method according to claim 5, comprising:
    receiving a series of values of a signal representing a magnetic field strength;
    forming an average value of the magnetic field strength over a period of time; and
    subtracting the average value of the magnetic field strength from the series of values of the signal representing the magnetic field strength to form said detected magnetic field.

7. A method according to claim 5, comprising:
    obtaining a digital audio signal at a third sample rate, and undersampling said digital audio signal to form said audio signal at said second sample rate.

8. A method according to claim 5, wherein said second sample rate is approximately equal to said sample rate.

9. A method according to claim 5, wherein the step of determining if there is a correlation between the sampled audio signal and the sampled detected magnetic field comprises performing a mathematical correlation operation on the sampled audio signal and the sampled detected magnetic field to obtain an output correlation function, and determining if a peak value of the output correlation function exceeds a predetermined threshold.

10. A method according to claim 1, further comprising:
    determining a direction of a source of said audio signal representing speech;
        determining a direction of a source of said magnetic field; and
    determining that the audio signal may result from a replay attack if the direction of the source of said audio signal representing speech corresponds to the direction of the source of said magnetic field.

11. A system for detecting a replay attack on a voice biometrics system, the system comprising:
    an input for receiving an audio signal representing speech from a microphone;
    a detector for detecting a magnetic field proximate the microphone; and
    a processor for determining if there is a correlation between the audio signal and the magnetic field; and, if there is a correlation between the audio signal and the magnetic field, determining that the audio signal may result from a replay attack from a loudspeaker.

12. A non-transitory storage medium having instructions therein which when executed by a processor cause an apparatus to perform a method according to claim 1.

13. A method of detecting a replay attack on a voice biometrics system, the method comprising:
    receiving, at a microphone, an audio signal representing speech;

determining a direction of a source of said audio signal representing speech;

detecting a magnetic field proximate the microphone;

determining a direction of a source of said magnetic field; and determining that the audio signal may result from a replay attack from a loudspeaker if the direction of the source of said audio signal representing speech corresponds to the direction of the source of said magnetic field.

14. A method as claimed in claim 13, comprising receiving the audio signal representing speech from multiple microphones.

15. A method as claimed in claim 13, comprising detecting components of the magnetic field in three orthogonal directions.

16. A system for detecting a replay attack on a voice biometrics system, the system comprising:

an input for receiving an audio signal representing speech from a microphone;

a detector for detecting a magnetic field proximate the microphone; and a processor for: determining a direction of a source of said audio signal representing speech; determining a direction of a source of said magnetic field; and determining that the audio signal may result from a replay attack from a loudspeaker if the direction of the source of said audio signal representing speech corresponds to the direction of the source of said magnetic field.

17. A non-transitory storage medium having instructions therein which when executed by a processor cause an apparatus to perform a method according to claim 13.

* * * * *